United States Patent Office 3,837,957
Patented Sept. 24, 1974

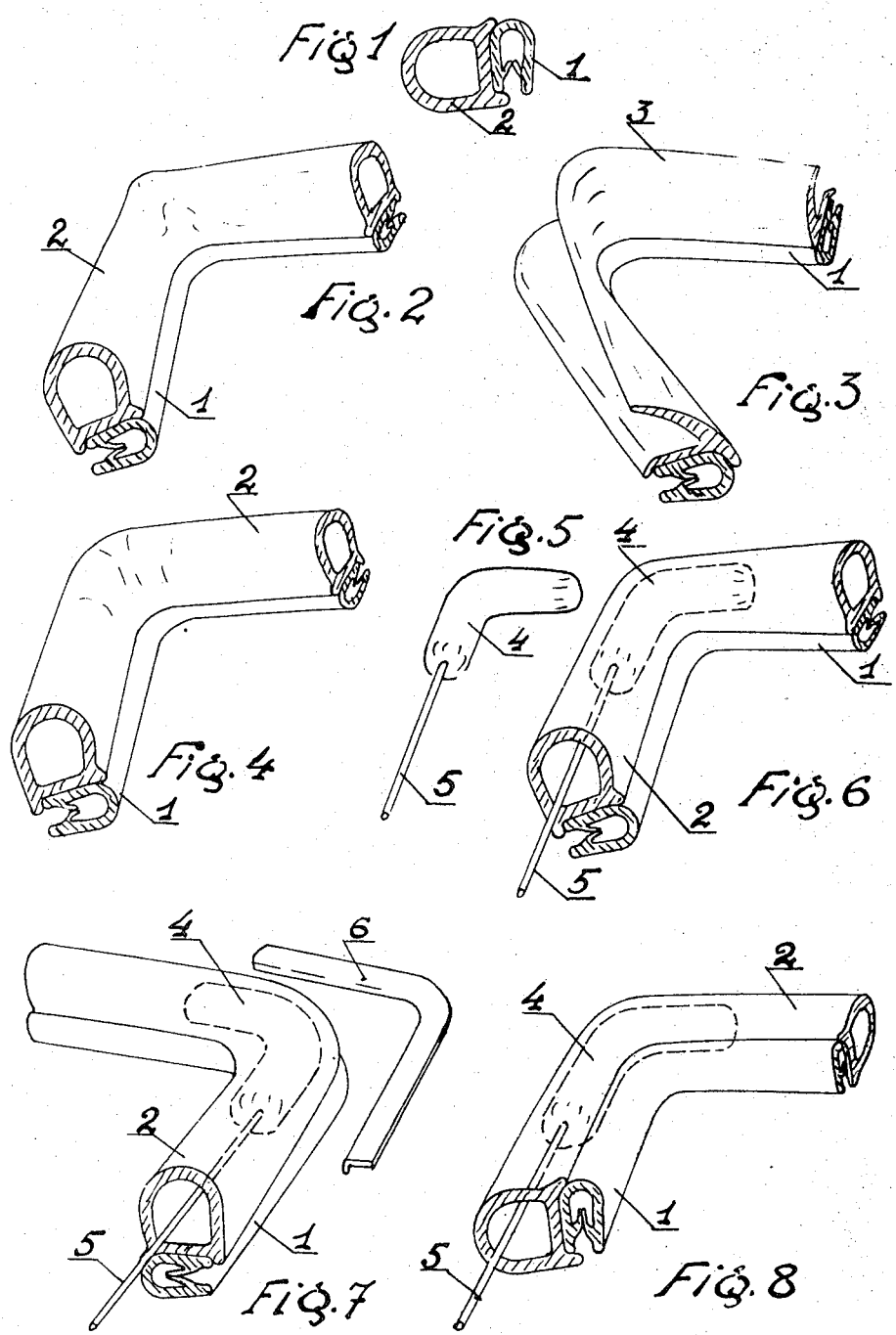

3,837,957
METHOD OF SHAPING A SEALING STRIP
Francois Pierre Mesnel, Neuilly-sur-Seine, France, assignor to Etablissements Mesnel, Colombes, France
Filed Apr. 28, 1972, Ser. No. 248,731
Int. Cl. B29c 23/00, 27/00
U.S. Cl. 156—221                    10 Claims

ABSTRACT OF THE DISCLOSURE

In a method of shaping a sealing strip, which comprises a fixing section of plastics material and a sealing section of vulcanisable elastomeric material, to fit a panel such as a vehicle door, the sealing section is only partially vulcanised after formation thereof and the sealing strip is constrained to a desired shape conforming to the panel and the strip heated to complete vulcanisation of the sealing section and to soften the plastics material of the fixing section so that the strip takes up and permanently retains the shape to which it has been constrained.

---

This invention relates to sealing strips for attachment to the edges of panels such as vehicle doors.

A known sealing strip for use around a vehicle door comprises an elongate fixing element, which may have been extruded around or may incorporate a metal armature or core, and an elongate sealing element attached to a vehicle door, for example by a recess of the fixing element engaging the edges of the door panel, it is often difficult to ensure that both elements follow closely sharp bends or deformations in the door edge, for example at the corners of the door and adjacent locks, hinges or the like. This is a great disadvantage. The fixing element is usually made from a synthetic plastics material and the sealing element is usually made from a vulcanisable elastomeric material and may be in the form of a hollow extruded section or a resilient lip.

It is extremely difficult to ensure that the sealing strip does "fit" the door properly and to effect such fitting it is known to cut the strip adjacent each corner of the door, remove wedge-shape sections from the strip and rejoin the cut edges to form a type of mitre joint. Such reshaping is very time consuming and costly and a severe disadvantage.

It is an object of the present invention to provide a method of making a sealing strip whereby the above disadvantages are obviated or minimised and accordingly the invention provides a method of shaping a sealing strip to conform to the shape of a panel such as a vehicle door, the sealing strip comprising a fixing section of plastics material and a sealing section of vulcanisable elastomeric material, wherein the sealing section, after its formation, is subjected to a partial vulcanisation sufficient to enable it to be handled, the sealing strip is constrained to a shape conforming to the shape of the panel and the strip heated so as to complete vulcanisation of the sealing section, and so cause it permanently to assume the shape to which it has been constrained and so as to soften the plastics material of the fixing section to cause it also to assume the shape to which it has been constrained and, after cooling, permanently to retain that shape.

The invention also includes a sealing strip shaped by the above method.

The invention will be described further, by way of example, with reference to the accompanying drawings, wherein:

FIG. 1 is a transverse cross-section through a conventional sealing strip for use around a door of a vehicle such as a car;

FIG. 2 is a fragmentary perspective view illustrating a strip of cross-section conforming to FIG. 1 which has been bent to fit a corner of a vehicle door, deformation of the strip being evident at the corner;

FIG. 3 is a view similar to FIG. 2 but illustrating a sealing strip whose sealing element is in the form of a resilient lip, deformations produced by bending being apparent at the corner;

FIG. 4 is a view similar to FIG. 2 but illustrating how the deformations shown in FIG. 2 can be eliminated by cutting wedge-shaped portions from the strip and rejoining the cut edges to form mitre type joints;

FIG. 5 is a perspective view of a core which can be used when shaping a sealing strip in conformity with a preferred embodiment of method conforming to the invention;

FIG. 6 illustrates a step in a preferred embodiment of method conforming to the invention, wherein the strip is being bent to fit inside a sharp corner;

FIG. 7 is similar to FIG. 6 but showing a strip being bent to fit outside a sharp corner and further illustrating an auxiliary core which can be used to assist in bending a fixing section of the strip; and FIG. 8 is a view comparable with FIGS. 6 and 7 but showing a strip being bent to fit a curve in a plane at right angles to the plane of a panel.

FIG. 1 shows, in cross-section, a sealing strip for attachment to the edges of a panel of a vehicle door. The strip comprises a generally U-sectioned fixing section 1 of plastics material, which has lips which enable it to grip the panel and which has been extruded around or incorporates a sheet metal armature or core. Attached to the fixing section 1 is a sealing section 2 of resilient vulcanisable elastomeric material such as natural or synthetic rubber. In FIG. 1 the sealing strip is shown to be in the form of a hollow extrusion, but it can, as can be seen in FIG. 3, be in the form of a resilient lip. The sealing section 2 can be of foamed material if so desired. Preferably, when the sealing section is hollow, the walls thereof are as thin as is reasonably possible.

In order to follow closely deformations in and corners of the door, as well as parts of the door adjacent lock, hinges or the like, the sealing strip 2 has heretofore been made as flexible as possible, e.g. by having thin walls or being of very light foamed material. This feature has also been necessary to ensure quietness upon closing of the door. This flexibility of the sealing strip 2 has led, in the past, to deformations occurring as is illustrated in FIGS. 2 and 3. These deformations often lead to gaps being formed at the corners of the door, thus letting in draughts or rainwater, and also failure of the strip after some time in use.

In order to obviate these disadvantages it has been known to cut wedge-shaped portions from the strip adjacent a corner and re-join the cut edges to form mitre-type joints, as is illustrated in FIG. 4. This operation is, of course, time consuming and costly.

A preferred embodiment of method conforming to the invention eliminates or minimises these disadvantages. In the preferred method the strip is preshaped before fitting to the vehicle door. This is achieved by, after extrusion or moulding of the sealing section, effecting only sufficient partial vulcanisation thereof to permit handling and storage of the strip. When the extruded sealing section 2 is submitted, immediately after its extrusion, to a process of continuous vulcanisation the length of time the strip spends in the usual heating medium, whether this is a salt bath, warm air, a fluidized bed, ultra-sonic vibrations or microwave heating, is limited to the minimum time necessary to obtain a manipulable and storable sealing section 2.

The sealing section 2 is now adhered in conventional manner to the fixing section 1 which has been extruded in plastics material. When it is desired to affix a sealing strip to door, or by working from a pattern of the door, there are introduced into the hollow sealing section 2 one or more cores 4 (as illustrated in FIG. 5) which deform the strip to its desired shape. The position of the core or cores 4 will depend, of course, on the shape of the door or panel which is to have the sealing strip affixed thereto. Introduction of the core or cores 4 can be facilitated by use of a lubricant, for example a silicone containing lubricant. The cores 4 can be supported for handling on rods 5. Alternatively cores 4 can be introduced to desired positions by compressed air injected into the sealing section.

Maintaining a curved shape of the fixing section 1 can be effected by introducing thereinto a shaped auxiliary core or insert 6 (FIG. 7) which can be of metal.

After insertion of the core or cores 4 and auxiliary cores 6 of the whole strip, or a part thereof, is enclosed in, for example, a warm air oven and heated. This heating effects a completion of the vulcanisation of the material of the sealing section 1 which sets permanently in the shape which has been imposed thereon by the cores 4. The temperature of the oven or other heating means must not be so high as to degrade or cause flowing of the plastics material of the fixing section 1, but can be high enough to render the sealing section 1 plastic, after cooling. Thus, after cooling, the sealing section permanently takes up the desired configuration imposed upon it by bending or by the auxiliary core or cores 6. The nature of the plastics material of the fixing section usually imposes an upper limit on the vulcanisation temperature and this may necessitate a fairly long vulcanisation time. With average materials a vulcanisation for between one and two hours at a temperature between 130° C. and 150° C. is sufficient.

After cooling the cores 4 and auxiliary cores 6 are withdrawn, the sealing strip having assumed and will maintain its desired shape, and is thus capable of matching the contours of the panel to which it will be attached and the frame with which it will seal.

When the sealing section is in the form of a lip (FIG. 3) or a solid strip of foamed material the cores 4 can be replaced by correspondingly shaped moulds which have a plurality of parts and held around the strip at appropriate positions to constrain the strip to a desired shape whilst completion of the vulcanisation is effected. In this case the overall method of shaping the strip is in all ways analogous to that described above.

A strip shaped by the described method not only has a more pleasing appearance, but the cycle of operations of the above method is cheaper than the previously used method involving cutting the strip and rejoining it to form mitre-type joints. The method of the invention also allows a wider choice of materials to be used for the sealing section. The sealing section can be of low cellular density or be of very thin wall thickness, these latter features result in a door provided with the strip to be closed quietly.

It will be appreciated that the invention provides a method of shaping a sealing strip which enables deformations or folds at corners of panels to be eliminated or minimised and also improves the sealing characteristics of the strip. The strip shaped by the method of the invention is also of more pleasing appearance and is cheap to produce.

The invention, which also includes a sealing strip shaped by the described methods, is not limited to the precise details described and variations can be made thereto within the scope of the following claims.

By way of example it must be mentioned that the invention is applicable to sealing strips for use around panels other than those of vehicle doors and the sealing strip can be of materials other than those described. The methods can be applied to a strip which comprises a fixing section of compact elastomeric material and a sealing section of cellular or foamed material. Many other variations and applications are, of course, possible.

I claim:

1. A method of shaping a sealing strip to conform to the shape of a panel such as a vehicle door, the sealing strip comprising a fixing section of plastics material and a sealing section of vulcanisable elastomeric material, said method comprising the following steps:
   subjecting said sealing section, after its formation, to a partial vulcanisation sufficient to enable it to be handled, without being constrained into any ultimate shape,
   adhering said sealing section to said fixing section,
   then constraining the sealing strip to a shape conforming to the shape of the panel,
   heating said sealing strip while constrained in order to complete vulcanisation of the sealing section and to cause it permanently to assume the shape to which it has been constrained, and also to soften the plastics material of the fixing section in order to cause it to assume the shape to which it has been constrained, and
   cooling said sealing strip in order to cause it to permanently retain its constrained shape.

2. A method as claimed in claim 1, wherein the sealing section is hollow and constrained to the desired shape by at least one suitably shaped core inserted therein.

3. A method as claimed in claim 2, wherein a lubricant, for example containing silicone, is used to facilitate the introduction into and the withdrawal from said sealing section of said core.

4. A method as claimed in claim 2, wherein said core is mounted on a support rod.

5. A method as claimed in claim 3, wherein said core is mounted on a support rod.

6. A method as claimed in claim 2, wherein said core is positioned inside the sealing section by compressed air injected into the sealing section.

7. A method as claimed in claim 3, wherein said core is positioned inside the sealing section by compressed air injected into the sealing section.

8. A method as claimed in claim 1 wherein the sealing strip is in the form of a resilient lip and is constrained to the shape desired by means of moulds, said moulds comprising a plurality of parts, applied to the strip at desired locations.

9. A method as claimed in claim 2, wherein the sealing section, after having been bent to the desired shape is maintained in that shape by at least one shaped auxiliary core.

10. A method as claimed in claim 1 including forming smooth corners in said sealing section free of any mitre joints.

References Cited
FOREIGN PATENTS

| | | | |
|---|---|---|---|
| 1,547,688 | 1968 | France | 52—716 |
| 723,664 | 1955 | Great Britain | 264—236 |
| 10,621 | 1909 | Great Britain | 264—347 |
| 1,457,531 | 1966 | France | 52—716 |

GEORGE F. LESMES, Primary Examiner

P. THIBODEAU, Assistant Examiner

U.S. Cl. X.R.

52—116; 156—244, 245; 161—139; 264—236, 285